June 22, 1954  L. G. HALL  2,681,577
FOOT PEDAL STEERING MEANS FOR TRACTORS
Filed Dec. 4, 1952
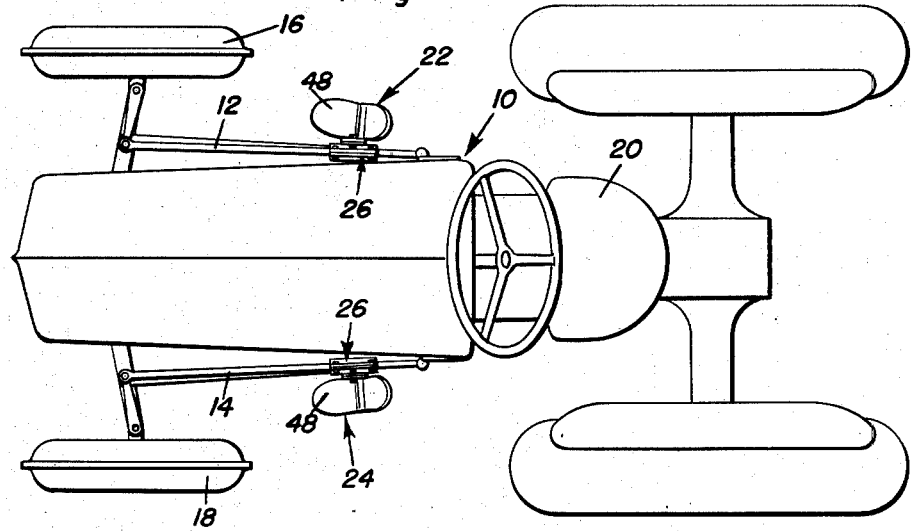
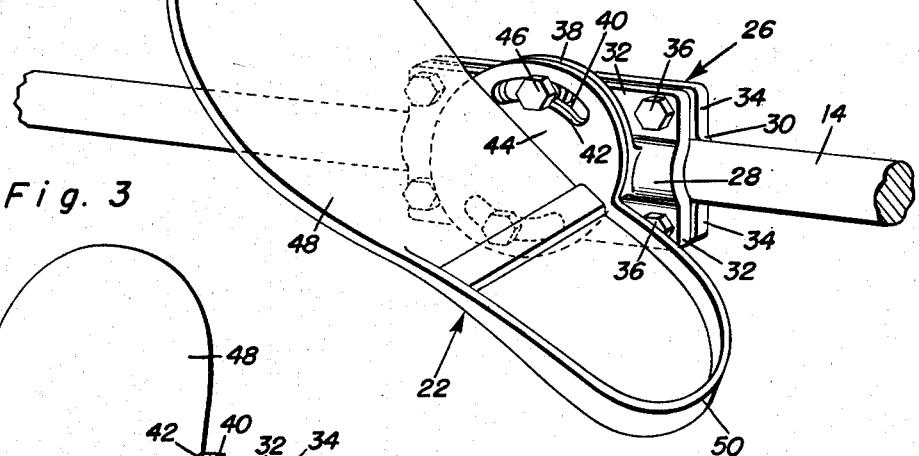
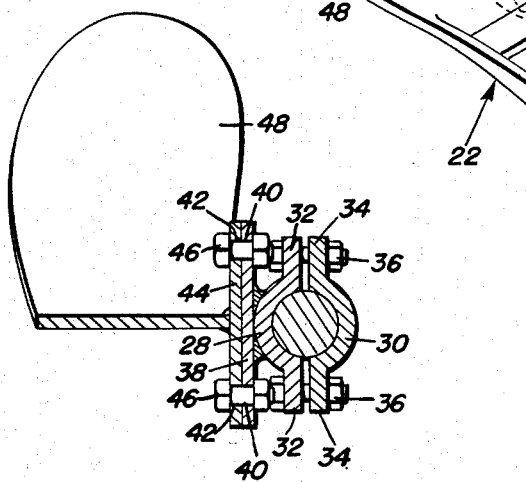
Lawrence G. Hall
INVENTOR.

Patented June 22, 1954

2,681,577

UNITED STATES PATENT OFFICE 2,681,577

FOOT PEDAL STEERING MEANS FOR TRACTORS

Lawrence G. Hall, Cleveland, Tex.

Application December 4, 1952, Serial No. 324,100

3 Claims. (Cl. 74—478)

1

This invention relates to new and useful improvements in steering means for tractors and the primary object of the present invention is to provide a foot pedal actuated attachment for the steering rods of tractors whereby the tractor operator may control the steering of the tractor while having his hands free for manipulating the various tractor controls.

Another important object of the present invention is to provide a pair of foot pedal units and means for adjustably clamping the same upon the left and right steering rods of a tractor so that the pedals will be conveniently accessible to the feet of a tractor operator seated on the tractor seat.

A further object of the present invention is to provide a foot pedal attachment for the steering rods of tractors which may be longitudinally adjusted upon the steering rod and pivotally adjusted in a convenient manner for accommodating the feet of a tractor operator.

A still further aim of the present invention is to provide a foot pedal steering means for tractors that is extremely simple and practical in construction, strong and reliable in use, efficient and durable in construction, inexpensive to manufacture, and otherwise well adapted for the purposes for which the same is intended.

These and other ancillary objects and advantages reside in the details of construction and operation as more fully hereinafter described and claimed, reference being had to the accompanying drawings forming a part hereof, wherein like numerals refer to like parts throughout, and in which:

Figure 1 is a top plan view of a tractor and showing the present invention applied to the steering rods of the tractor;

Figure 2 is an enlarged fragmentary view of Figure 1 and showing the invention in perspective attached to the left steering rod; and Figure 3 is a transverse vertical sectional view taken substantially through the center of the pedal attachment shown in Figure 2.

Referring now to the drawings in detail, wherein for the purpose of illustration, there is disclosed a preferred embodiment of the present invention, the numeral 10 represents a tractor having right and left steering rods 12 and 14 that extend from the forward steering wheels 16 and 18 of the tractor rearwardly along opposite sides of the tractor toward the tractor seat 20.

The present invention comprises foot operated means which are adjustably mounted on the

2 steering rods 12 and 14 whereby these rods may be foot actuated for steering of the tractor, thereby leaving the tractor operator's hands free for manipulating the various controls of the tractor.

The foot operated means consists of right and left foot pedal units 22 and 24, each of which includes a clamp bracket 26 having inner and outer rigid channels 28 and 30 whose flat parallel flanges 32 and 34 are apertured to accommodate fasteners 36 that clampingly secure the brackets 26 upon their supporting steering rods 12 and 14. The brackets 26 may be longitudinally adjusted on the rods 12 and 14, in accordance with the length of the tractor operator's legs, by merely loosening the fasteners 36, moving the brackets on their supporting rods 12, 14, either forwardly or rearwardly, and then tightening the fasteners 36.

A vertical, circular bearing plate 38 is fixed by welding or the like to the outer face of each outer channel 28 and these vertical plates 38 are provided with a pair of diametrically opposed arcuate slots 40 that register with a pair of arcuate slots 42 in a pair of circular mounting plates 44. Bolts 46 extend through the slots 40 and 42 and have nuts threaded thereon, whereby the plates 38 and 44 may be clamped against each other. The nuts may be loosened and the plates 44 rotated relative to the plates 38, after which the nuts are tightened to clampingly retain the plates 44 in a selected rotated position relative to the plates 38.

The plates 44 are fixed to or form an integral part of the inner side edges of a pair of foot pedals or plate elements 48 which are shaped to the sole of a shoe. Each plate element 48 is formed with an upstanding flange 50 at its rear end portion forming a heel rest for the operator's foot overlying the plate elements.

In practical use of the present invention, the clamp brackets 26 are moved upon the rods 12 and 14 until they are disposed at a position convenient to the feet of an operator seated upon the seat 20. The fasteners 36 are then tightened to clamp the channels 28 and 30 against their supporting rods. Next, the nuts on bolts 46 are loosened and the plate elements 48 swung upwardly or downwardly until the operator's feet assume a comfortable position on these plate elements. Then, the nuts of the bolts 46 are tightened to clamp the plates 44 against plates 38 and thereby retain the plate element 48 in its previously placed position. After the pedal units 22 and 24 are attached to the steering rods 12 and 14, the tractor operator may control the steering of the tractor while having his hands free for manipulating the various controls of the tractor.

Although the invention thus described is used for steering a tractor, obviously the pedals will function as foot rests whereby a user's feet will be disposed in a comfortable position while the tractor is in use, thereby obviating the heretofore leg tiredness brought about by less practically located pedals.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even thought there is herein shown and described a preferred embodiment of the invention, the same is susceptible to certain changes fully comprehended by the spirit of the invention as herein described and the scope of the appended claims.

What is claimed as new is as follows:

1. In a tractor having right and left steering rods that extend along opposite sides of the tractor body, means attached to the rods whereby the rods may be foot actuated by an operator seated on the tractor seat, said means comprising left and right foot pedals, left and right clamp brackets secured to the left and right rods respectively adjacent the rear ends of said rods, a vertical bearing plate fixed to each clamp bracket, vertical mounting plates fixed to said foot pedals, and means securing the mounting plates against said bearing plates.

2. In a tractor having right and left steering rods that extend along opposite sides of the tractor body, means attached to the rods whereby the rods may be foot actuated by an operator seated on the tractor seat, said means comprising left and right foot pedals, left and right clamp brackets secured to the left and right rods respectively adjacent the rear ends of said rods, a vertical bearing plate fixed to each clamp bracket, vertical mounting plates fixed to said foot pedals, each of said bearing and mounting plates having a pair of diametrically opposed arcuate slots, and bolts extending through the slots in the mounting plates and the slots in the bearing plates and adjustably securing the mounting plates against the bearing plates.

3. A foot pedal attachment for the steering rods of tractors, said attachment comprising a clamp bracket composed of complemental gripping channels connected together by fasteners, a vertical plate fixed to one of said gripping channels and having a pair of slots therein, an elongated plate element shaped to the sole of a shoe and having a flanged end forming a heel rest, a vertical plate fixed to said plate element and having a pair of slots therein for registering with the slots in the first named plate, and bolts extending through the first and last named slots and adjustably clamping the plates in juxtaposition.

References Cited in the file of this patent

UNITED STATES PATENTS

| Number | Name | Date |
|---|---|---|
| 1,629,381 | Hill | May 17, 1927 |
| 1,632,311 | Phelps | June 14, 1927 |
| 2,445,263 | Farmer | July 13, 1948 |
| 2,456,390 | Creson et al. | Dec. 14, 1948 |